United States Patent
Kuragaki et al.

(10) Patent No.: US 6,637,836 B2
(45) Date of Patent: Oct. 28, 2003

(54) BRAKE SERVO UNIT CONTROL DEVICE

(75) Inventors: Satoru Kuragaki, Hitachi (JP); Tokuji Yoshikawa, Hitachi (JP); Atsushi Yokoyama, Niihari (JP); Toshio Manaka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/961,439

(22) Filed: Sep. 25, 2001

(65) Prior Publication Data

US 2002/0117894 A1 Aug. 29, 2002

(30) Foreign Application Priority Data

Feb. 28, 2001 (JP) .......................... 2001-053424

(51) Int. Cl.⁷ .............................. B60T 8/44; B60T 7/12; B60T 13/52; B60T 13/66; B60T 13/72
(52) U.S. Cl. .................... 303/114.3; 303/191; 303/166; 303/DIG. 4
(58) Field of Search .................. 303/114.3, 113.4, 303/155, 166, DIG. 3, DIG. 4, 135, 125, 113.2, 113.3, 122, 122.08, 157, 158, 191, 193, 119.2; 188/355–359; 180/167, 170; 91/369.1, 369.2, 361, 367, 376 R; 701/96, 70, 78, 83, 35

(56) References Cited

U.S. PATENT DOCUMENTS

| | | | |
|---|---|---|---|
| 5,979,292 A | * | 11/1999 | Klesen et al. |
| 6,006,648 A | * | 12/1999 | Eckert |
| 6,033,039 A | * | 3/2000 | Dieringer .................. 303/114.3 |
| 6,185,498 B1 | * | 2/2001 | Linden et al. ........... 303/113.3 |
| 6,209,968 B1 | * | 4/2001 | Bayens et al. ........... 303/114.3 |
| 6,357,837 B1 | * | 3/2002 | Linden et al. ........... 303/114.3 |
| 6,453,735 B1 | * | 9/2002 | Böhm |
| 2001/0017077 A1 | * | 8/2001 | Kuragaki et al. .............. 91/367 |

FOREIGN PATENT DOCUMENTS

| | | | |
|---|---|---|---|
| EP | 1127762 | * | 8/2001 |
| WO | 9630246 | * | 10/1996 |

* cited by examiner

Primary Examiner—Douglas C. Butler
(74) Attorney, Agent, or Firm—Crowell & Moring LLP

(57) ABSTRACT

The solenoid current increases at low temperatures and decreases at high temperatures because the modulus of elasticity of an elastically deformable valve body and the slide resistance of an elastically deformable seal member vary with temperatures. Therefore the solenoid current for opening the valve mechanism from a closed position is required to be changed with low and high temperatures. To supply the solenoid current necessary for opening the valve mechanism without directly measuring the temperature, the solenoid current (the boost starting current leaning value) indicated when the pressure varies with the opening of the valve mechanism is recorded at the time of pressure-increasing, and thereafter when the valve mechanism is opened again after the closing of the valve mechanism, the solenoid current computed on the basis of the pressure-increase starting current learning value thus recorded is supplied.

4 Claims, 9 Drawing Sheets

WHEN "DEVICE IS FAULTY" IS DECIDED IN ALL STATES, A TRANSITION IS MADE TO "CONTROL PROHIBIT"

$P_{CMD}$ : PRESSURE COMMAND $\dot{P}_{CMD}$ : TIME DIFFERENTIAL OF PRESSURE COMMAND $P_{M/C}$ : MASTER CYLINDER PRESSURE SENSOR VALUE $\Delta P = P_{CMD} - P_{M/C}$ $T_{ZERO}$ : ELAPSED TIME AFTER PRESSURE COMMAND REACHES BELOW $P_D$

BRAKE SERVO UNIT CONTROL DEVICE

CROSS REFERENCE TO RELATED APPLICATION

This application is related to U.S. application Ser. No. 09/790,528 filed on Feb. 23, 2001.

BACKGROUND OF THE INVENTION

1. Field of the Invention

The present invention relates to a braking device for vehicles.

2. Description of Related Art

The braking device, as disclosed in Japanese Patent Laid-Open No. 2001-10481, uses a brake servo unit. The servo unit has the valve body of which a solenoid mechanism is incorporated. As the solenoid mechanism is energized, a movable core is moved to thereby open a valve mechanism such as an atmospheric pressure valve or a vacuum valve. This brake servo unit is operated by the displacement of an input rod working with a brake pedal. Furthermore the valve mechanism is able to operate the brake servo unit separately from operation of said brake pedal. Namely, as the solenoid is turned the power on and thereby the valve mechanism is operated, the quantity of air flowing between a constant pressure chamber and an operating pressure chamber of the brake servo unit is controlled, and a pressure difference between these chambers is generated. Thereby, it is able to provide a pressure with brake liquid in a master cylinder. The pressure thus increased is applied to a slave cylinder of each wheel, applying brakes to the vehicle. (Automatic brakes)

SUMMARY OF THE INVENTION

In the brake servo unit described above, in automatic brake application, in order to open the valve mechanism (atmospheric pressure valve) by moving the movable core of the solenoid mechanism, it is necessary to supply the solenoid current for generating a greater electromagnetic force than a total of three kinds of the following reactions: a reaction caused by the elastic deformation of an elastically deformable valve body forming the valve mechanism, a reaction caused by spring, and a reaction caused by the slide resistance of an elastically deformable seal member. Because the modulus of elasticity of the elastically deformable valve body and the slide resistance of the elastically deformable seal member vary with temperatures, the modulus of elasticity and the slide resistance increase at low temperatures (lower than −10° C.) and decrease at high temperatures (higher than 60° C.). Therefore, it is necessary to change the solenoid current for opening the valve mechanism according to high and low temperatures so that the solenoid current is increased at high temperatures and decreased at low temperatures.

On the other hand, in order to open the valve mechanism (vacuum valve) by moving the movable core of the solenoid mechanism for releasing the automatic brakes, it is necessary to supply the solenoid current for generating a greater electromagnetic force than a total of two kinds of the following reactions: a reaction caused by spring deformation and a reaction caused by the slide resistance of the elastically deformable seal member. As stated above, the slide resistance of the elastically deformable seal member vary with temperatures, so that it is necessary to change the solenoid current for opening the valve mechanism according to high and low temperatures. It is necessary that the solenoid current is increased at high temperatures and decreased at low temperatures.

The present invention solves the above-described problem by the following way. During pressure-increasing of master cylinder in automatic brakes, the solenoid current, at the time the valve mechanism for pressure-increasing is opened and the pressure is changed, is learned and recorded as learned value of pressure-increase starting current. Then, when the valve mechanism is opened again, the solenoid current is corrected on the basis of the learned value of pressure-increase starting current recorded above. The solenoid current necessary to open the valve mechanism is thereby supplied precisely without directly measuring the temperature.

During pressure-decreasing of master cylinder in automatic brakes, like during the pressure-increasing, the solenoid current, at the time the valve mechanism for pressure-decreasing is opened and the pressure is changed, is learned and recorded as learned value of pressure-decrease starting current Then, when the valve mechanism is opened again, the solenoid current corrected on the basis of the learned value of pressure-decrease starting current recorded above.

It becomes possible to constantly supply the proper solenoid current to the brake servo unit by updating the learned value of pressure-increase starting current every time the pressure is increased, excepting the first time of pressure-increasing after starting the servo unit. This operation is similarly applicable in the case of pressure decreasing.

It is also possible to constantly supply the proper solenoid current to the brake servo unit by recording a solenoid current command as the learned value of pressure-increase starting current in place of the solenoid current. This operation is similarly applicable in the case of pressure-decreasing.

DESCRIPTION OF THE PREFERRED EMBODIMENTS

Figure 1:
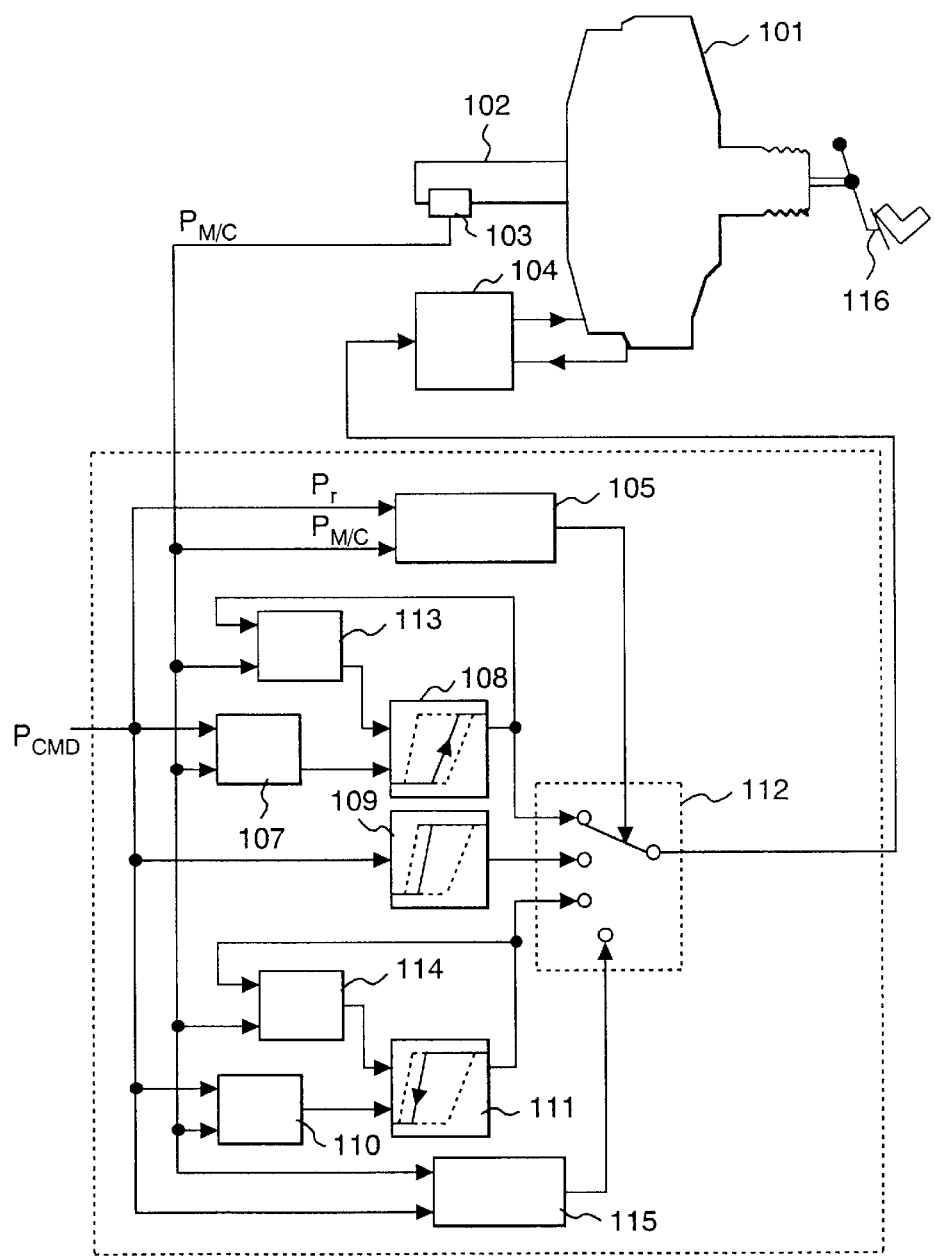
FIG. 1 is a block diagram of a control device according to the invention.
Figure 4:
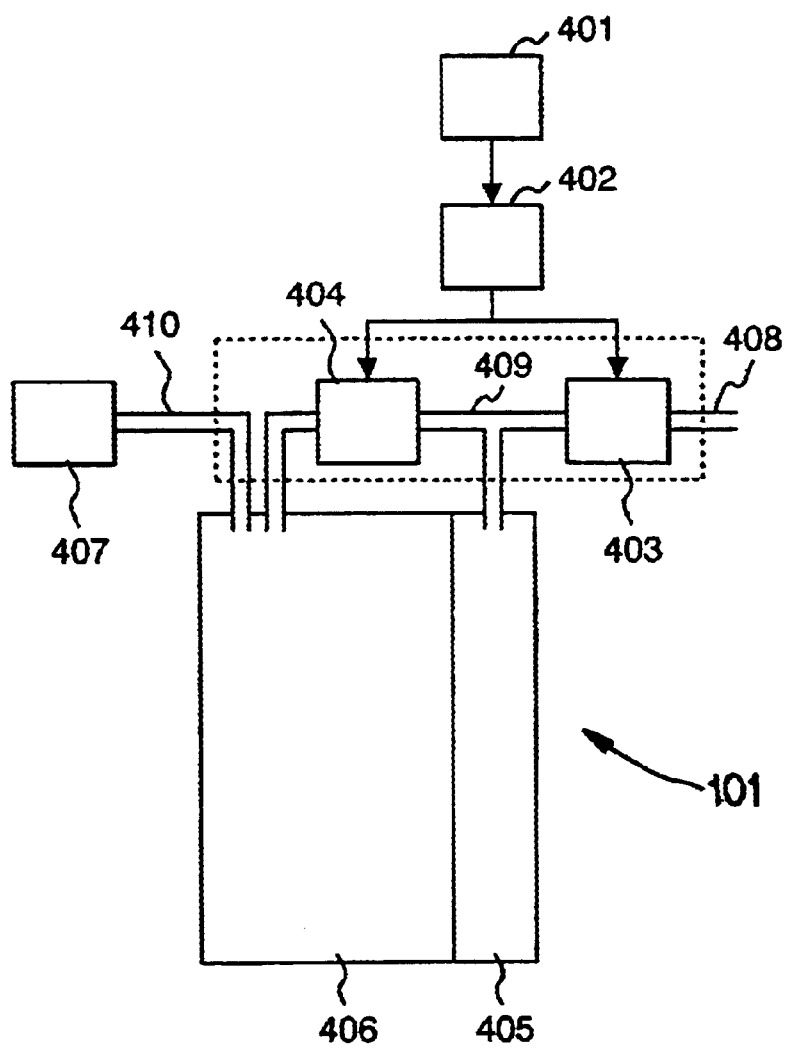
FIG. 4 is a block diagram for explaining the operation of the brake servo unit.

FIG. 1 is a block diagram showing the servo unit control device of the invention. The servo unit control device is comprised of a brake pedal 116, a servo unit 101 (hereinafter referred to as the servo) having a boost function to output an output power amplified on the basis of the inputted power of the brake pedal and a function to increase/decrease the output power of the servo by applying an electromagnetic force to the control valve for auto brakes, a master cylinder 102 of the servo, a pressure sensor 103 for detecting of the pressure of the master cylinder, a current source 104 for supplying the solenoid current to the servo, a pressure-increase control function 107 for controlling the liquid pressure-increasing of the master cylinder based on the deviation ΔP between the pressure command $P_{CMD}$ and the detected pressure $P_{M/C}$ of the master cylinder in auto brake, a learning function 113 for learning and recording a pressure-increase starting current command at the time the valve mechanism is operated and the pressure is changed in pressure-increasing, a pressure-current command conversion function 108 for converting the target pressure-increasing values to the current command which is corrected based on said pressure-increase starting current command, a pressure-current command conversion function 109 for converting target pressure values to the corresponding current command during pressure-holding, a pressure-decreasing control function 110 for controlling the liquid pressure-decreasing of the master cylinder based on the deviation ΔP between the pressure command $P_{CMD}$ and the detected pressure $P_{M/C}$ of the master cylinder in auto brake, a learning function 114 for learning and recording a pressure-decrease starting current command at the time the valve mechanism is operated and the pressure is changed in pressure-decreasing, a pressure-current command conversion function 111 for converting the target pressure-decreasing values to the current command which is corrected based on said pressure-decrease starting current command, a current command function 115 at the time of zero pressure (non-pressure state of the master cylinder) command, a current command changeover decision function 105 for deciding to change the current commands (a current command for pressure-increasing, a current command for pressure-decreasing, a current command for zero pressure) according to the pressure command, and a current changeover function 112 for changing over the current command in accordance with a result of the changeover decision function 105. As shown at FIG. 4, the servo 101 has a working (operating) pressure chamber 405, an atmospheric pressure valve 403 for supplying atmospheric pressure to the working pressure chamber, a constant pressure chamber 406, a vacuum source 407 for making vacuum state in the constant pressure chamber 407, a vacuum valve 404 for cutting off/opening between the working pressure chamber 405 and the constant pressure chamber 406, a passage 409 between the chamber 405 and 406, a passage 408 for supplying atmospheric pressure, a passage 410 for supplying vacuum pressure, a solenoid mechanism 402 for operating the valve 402 and 403, and a control device 401 for controlling the solenoid mechanism. The servo 101 has a function to control the opening and closing of the valve mechanism by supplying the current to the solenoid, to thereby control a master cylinder pressure. The pressure-current command conversion function 108 at the time of pressure-increasing changes the pressure command $P_{CMD}$ to the current command $I_{REF}$ by the use of a relation between the solenoid current during pressure-increasing and the pressure (detection value of the pressure sensor) of the master cylinder (the solenoid current and the pressure have been measured in advance). The pressure-current command conversion means 111 at the time of pressure-decreasing also changes the pressure command $P_{CMD}$ to the current command $I_{REF}$ similarly by the use of a relation between the solenoid current during pressure-decreasing and the pressure (detection value of the pressure sensor).

Figure 2:
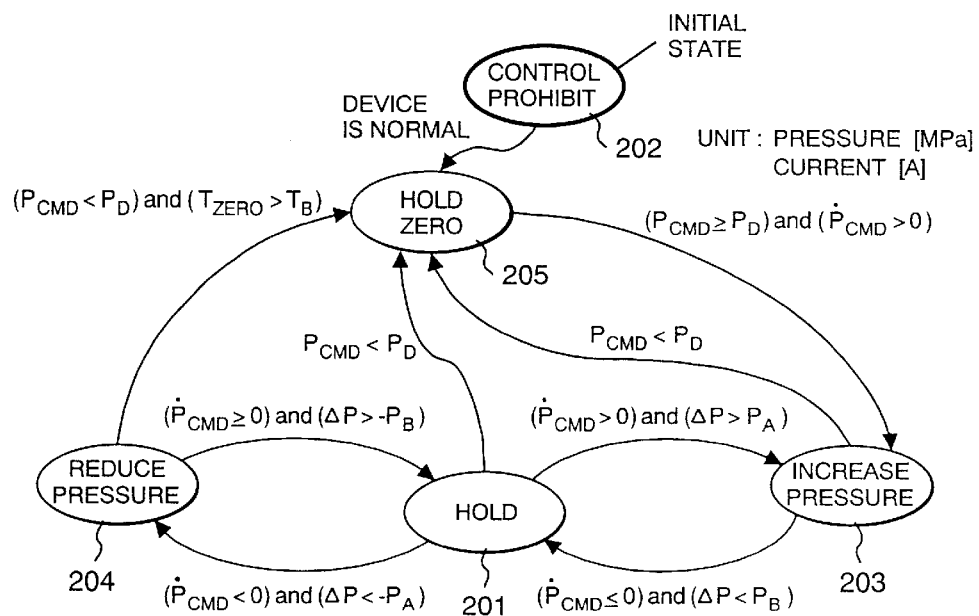
FIG. 2 is a view showing the state transition of control state changeover decision.

The decision of the changeover deciding means 105 is determined on the basis of the state transient view in FIG. 2.

During the initial period, the apparatus is in a control prohibit state 202. A self-diagnosis is conducted on the servo and its control device, when thereby the servo and its control device are confirmed that are in normal condition, the control mode transits the zero holding state 205. Also when it has been ascertained that the apparatus has some trouble, the control prohibit state 202 is continued.

In the zero holding state 205, when a pressure command $P_{CMD}$ is under the specific value $P_D$ (e.g., under 0.01 MPa), the solenoid current is set at zero to hold a pressure sensor value $P_{M/C}$ also at zero. The specific value $P_D$ is a threshold to distinguish whether the pressure command $P_{CMD}$ is zero or is not zero. When the pressure command $P_{CMD}$ is at a specific value $P_D$ and over, and the pressure command $P_{CMD}$ has increased (time differential of the pressure command namely d/dt $P_{CMD}$ is positive), the state makes a transition to the pressure-increase state 203. On the other hand the zero holding state 205 is continued in case the above-described condition is not established.

In the pressure-increase state 203, when the pressure command $P_{CMD}$ is under the specific value $P_D$, a transition is made to the zero holding state 205. Further, when the pressure command $P_{CMD}$ indicates "decreasing" or "fixed" (the time differential of the pressure command namely d/dt $P_{CMD}$ is negative or zero), and a difference between the pressure command $P_{CMD}$ and the pressure sensor value $P_{M/C}$ (hereinafter referred to as the pressure deviation ΔP), are under the specific value $P_B$, a transition is made to the hold state 201. When the condition is not established, the boost state 203 is continued.

In the hold state 201, when the pressure command $P_{CMD}$ is under the specific value $P_D$, a transition is made to the zero holding state 205. Also, when the pressure command $P_{CMD}$ has increased (the time differential of the pressure command d/dt $P_{CMD}$ is positive) and the pressure deviation ΔP is more than the specific value $P_A$, a transition is made to the boost state 203. The specific value $P_A$ is a threshold to distinguish increasing of the pressure command $P_{CMD}$. In the mean time, when the pressure command $P_{CMD}$ has increased (the time differential d/dt $P_{CMD}$ of pressure command is negative), and pressure deviation ΔP is under the specific value "$-P_A$", a transition is made to the pressure-decreasing state 204. In case the above three conditions are not established, the holding state 201 is continued.

In the pressure-decreasing state 204, when the pressure command $P_{CMD}$ in the state of under the specific value $P_D$ continues more than the specific time $T_E$, a transition is made to the zero-holding state 205. Furthermore, when the pressure command $P_{CMD}$ has increased (the time differential d/dt $P_{CMD}$ of pressure command is positive or zero) and the pressure deviation PΔ exceeds the specific value $-P_B$, a transition is made to the holding state 201. When the above two conditions are not established, the pressure-decreasing state 204 continues.

Also when it has been decided that the servo unit or the servo unit control device has a trouble, a transition is made from every state to the control prohibit state 202, and the solenoid current is decreased to zero.

Figure 3:
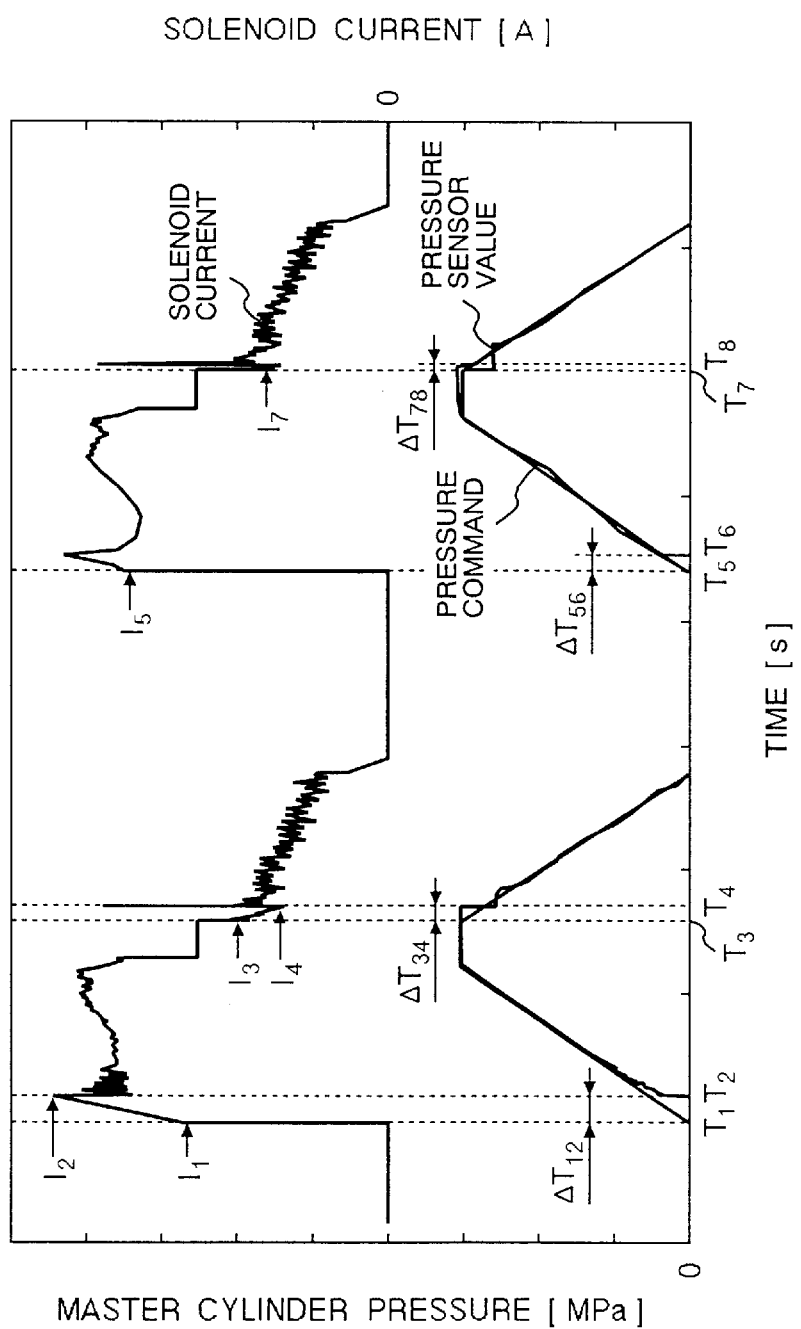
FIG. 3 shows a result of working of the invention.

Next, the operation of the servo unit control device during pressure-increasing will be explained in FIGS. 3 to 6. FIG. 3 shows behaviors of the pressure command $P_{CMD}$ and the solenoid current, and pressure sensor value $P_{M/C}$. FIG. 4 is a schematic view for explaining the operation of the servo unit 101. Before the time $T_1$ in FIG. 3, no electric current is supplied to the solenoid mechanism 402, and both an atmospheric pressure valve 403 and a vacuum valve 404 are closed, so that the pressure in a constant pressure chamber 406 and a working pressure chamber 405 is at the same value as that in the vacuum source 407. At the time $T_1$ in FIG. 3, the solenoid current $I_1$ is supplied from the control device 401 to the solenoid mechanism 402. The pressure sensor value $P_{M/C}$ remains zero till the time $T_2$, namely the solenoid current is not beyond a value to open the atmospheric pressure valve 403 according to described three kinds of reactions which change by temperatures. The solenoid current to be supplied is gradually increased at the later-described process flowchart in FIG. 6. At the time $T_2$, as the solenoid current increases to $I_2$, the atmospheric pressure valve 403 opens to allow the flow of the atmospheric pressure into the working pressure chamber 405 through the route 408. Since the vacuum valve 404 remains closed at this time, there occurs a pressure difference between the constant pressure chamber 406 and the working pressure chamber 405, applying a force resulting from the pressure difference to a master cylinder piston. With the application of the force to the piston, the master cylinder pressure increases to apply brakes. Then, at the process flowchart in FIG. 6, the supply of the solenoid current is changed as appropriate to thereby enable the pressure sensor value $P_{M/C}$ to change along the pressure command $P_{CMD}$.

In FIG. 3, the time required from the input of the pressure command $P_{CMD}$ till the observation of the pressure sensor value $P_{M/C}$ is $\Delta T_{12}$. To decrease the required time, the current supply is started with the solenoid current $I_5$ that has been corrected on the basis of the solenoid current $I_2$ at the time $T_2$ when the pressure sensor value $P_{M/C}$ could be observed.

Figure 5:
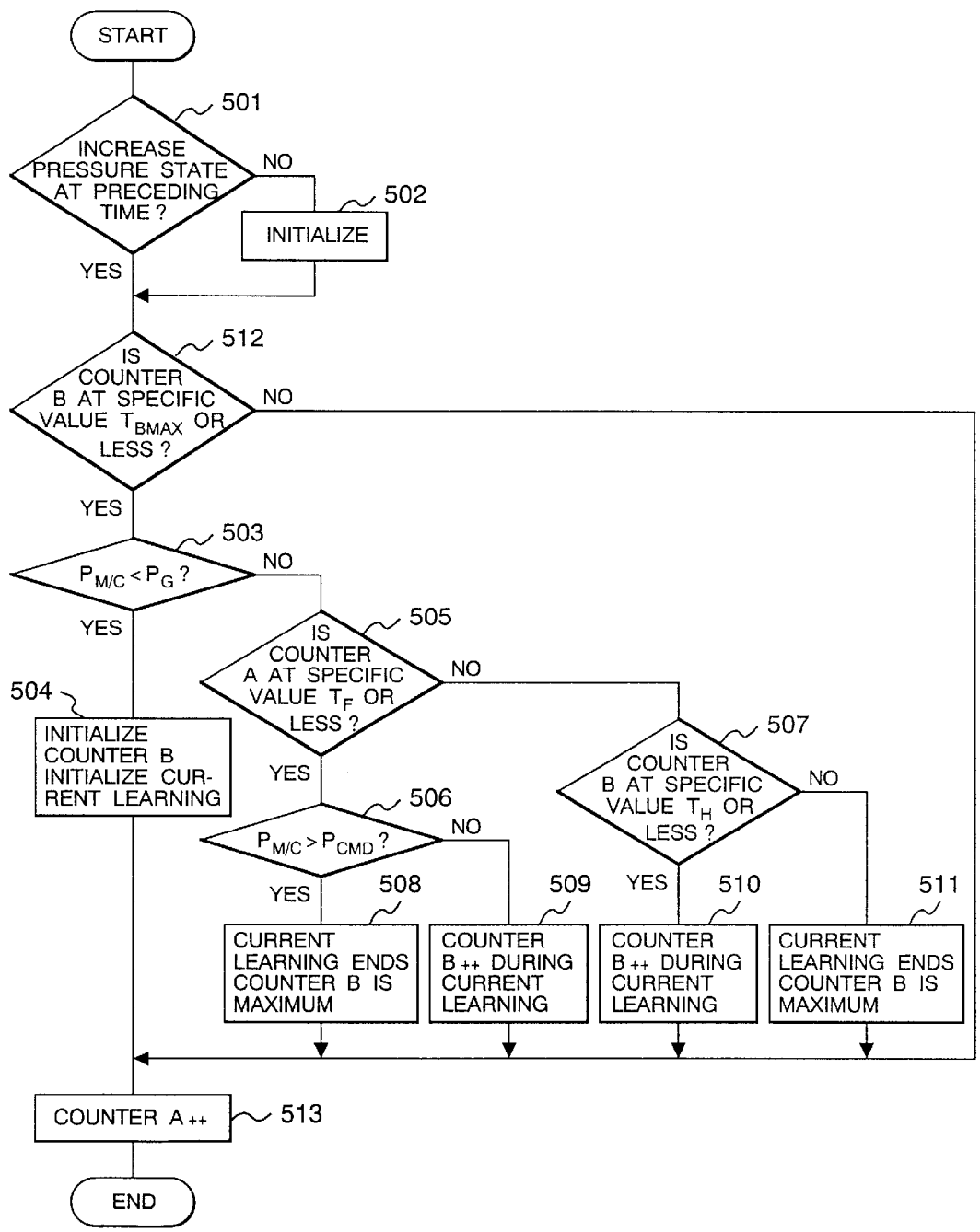
FIG. 5 is a flowchart showing a routine for learning a pressure-increase starting current command.

FIG. 5 is a processing flowchart for realizing by software the pressure-increase starting current command learning function 113 in FIG. 1. At Step 501, the preceding state of control is decided. When the preceding state is other than the pressure-increase state (in most cases, the zero-holding state), initialization processing is executed at Step 502 for recording the solenoid current learning value $I_L$. The initialization processing is for clearing two counters A and B to zero. The counter A measures the time after the increase of the pressure command $P_{CMD}$ over the specific value $P_D$. The counter A is to distinguish whether the pressure command $P_{CMD}$ is the state of outputting or not. The counter B measures the time after the increase of the pressure command $P_{CMD}$ over the specific value $P_G$. The counter B is to distinguish whether is the time band which learns the value of pressure-increase starting current command (the solenoid current command) or not. The maximum value of the band is $T_{BMAX}$. The specific value $P_G$ is a threshold to distinguish whether the pressure sensor value $P_{M/C}$ is beyond the noise level or not. When the preceding state is the pressure-increasing state, no initialization will be executed, and a decision is carried out at Step 512. At Step 512, a comparison is performed between the value of the counter B and the maximum value $T_{BMAX}$ of the counter B. When the value of the counter B is less than the maximum value $T_{BMAX}$, the routine proceeds to Step 503. On the other hand, when the value of the counter B is equal to or greater than the maximum value $T_{BMAX}$, the routine will be ended without any updating. At Step 503, a comparison is made between the pressure sensor value $P_{M/C}$ and the specific value $P_G$. When the pressure sensor value $P_{M/C}$ is less than the specific value $P_G$, the processing at Step 504 will be performed. On the other hand, when the pressure sensor value $P_{M/C}$ is greater than the specific value $P_G$, a decision at Step 504 will be made. At Step 504, the pressure sensor value $P_{M/C}$ is under the specific value $P_G$, as it is not the state that the counter B works, and therefore the counter B will be cleared to zero, and the pressure-increase starting current learning value $I_{LU}$ will be left at the last record value. At Step 505, a comparison is made between the reading of the counter A and the specific value $T_F$; when the reading of the counter A is less than the specific value $T_F$, the decision at Step 506 will be made. On the other hand, when the reading of the counter A is greater than the specific value $T_F$, a decision will be made at Step 507. The specific value $T_F$ is a threshold to distinguish whether the pressure-increasing starting current command is the most earliest process or not. At Step 506, a comparison is made between the pressure command $P_{CMD}$ and the pressure sensor value $P_{M/C}$. When the pressure sensor value $P_{M/C}$ is greater than the pressure command $P_{CMD}$, as the pressure-increasing start of auto brake is too fast and large, the pressure-increase starting current learning value $I_{LU}$ is updated as a value decreased by the specific value than the last record value at Step 508. Furthermore, the counter B is set at the maximum value, thus ending the updating of the pressure-increase starting current learning value $I_{LU}$. When the pressure sensor value $P_{M/C}$ is less than the pressure command $P_{CMD}$ at Step 506, the pressure-increase starting current learning value $I_{LU}$ is under learning at Step 509, then ending the routine by increasing the reading of the counter B by 1.

At Step 507, when the counter B is the specific value $T_H$ or less, the processing at Step 510 will be performed. When the counter B is the specific value $T_H$ or more, the processing of Step 511 will be performed. The specific value $T_H$ is the point of time at which the pressure-increase starting current (command) is learned and recorded. At Step 510, the pressure-increase starting current learning value $I_{LU}$ is under learning, ending by increasing the reading of the counter B by 1. On the other hand, at Step 511, the pressure-increase starting current learning value $I_{LU}$ is updated as a value which is less by the specific value than the pressure-increasing current command recorded on the $T_H$. Also the counter B is set at the maximum value, thus ending the updating of the pressure-increase starting current learning value $I_{LU}$.

According to the above-described processing flowchart, the pressure-increase starting current learning value (command) $I_{LU}$ that the pressure sensor value $P_{M/C}$ has exceeded the specific value $P_G$ can be updated every time pressure-increasing is started. The value to be learned may of course be a measured value of the solenoid current obtained when the pressure sensor value $P_{M/C}$ has exceeded the specific value $P_G$.

Figure 6:
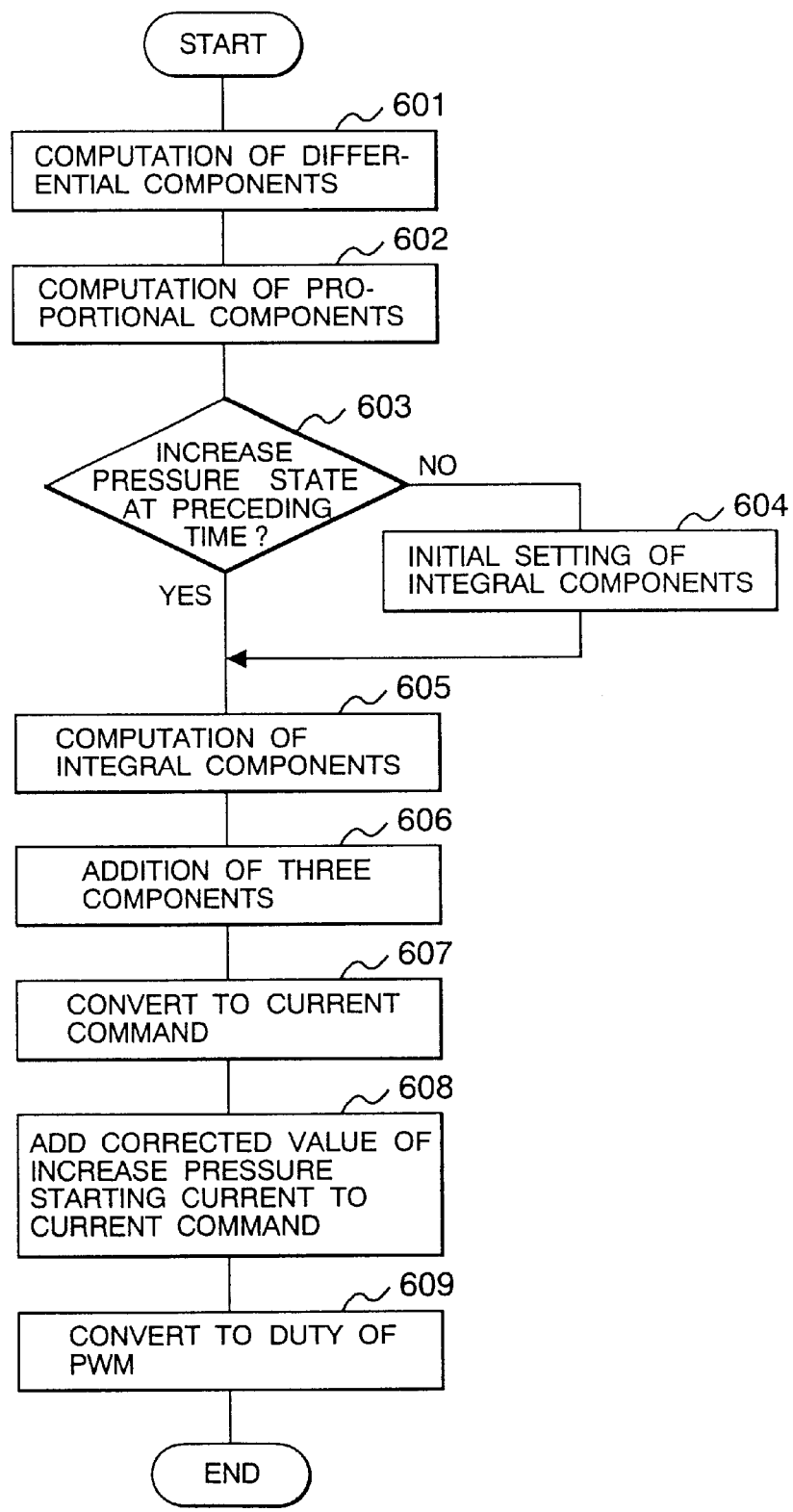
FIG. 6 is a process flowchart at the time of the pressure-increasing.

FIG. 6 shows a processing flowchart for realizing by software the pressure-increase control function 107 in FIG. 1 and the pressure-current command conversion function 108 at the time of the pressure-increase. At Step 601 the differential components of the pressure deviation $\Delta P$ are computed. At Step 602, the proportional components of the pressure deviation $\Delta P$ are computed. At Step 603, a decision is made on the preceding control state. When the preceding control state is the pressure-increase state, the processing proceeds to Step 605. Also when the preceding control state is other than the pressure-increase state, the processing proceeds to Step 605 after the initialization of integration components. At Step 605, the integration components are computed. Subsequently at Step 606, the addition of the above-described three components will be carried out.

$$P_{RU}=K_{PU}\times\Delta P+K_{IU}\times\int\Delta P dt+K_{DU}\times\Delta\dot{P} \qquad \text{[Equation 1]}$$

Furthermore, at Step 607, an added control command $P_{RU}$ is converted to a temporary current command $I_{TMP}$. This conversion is achieved by utilizing the previously measured current-pressure static characteristics during the pressure-increasing. At Step 608, the current command $I_{REF}$ is given by computing the temporary current command $I_{TMP}$, the pressure increase starting learning value $I_{LU}$, and the specific value $I_{CMP}$.

$$I_{REF}=I_{TMP}+I_{LU}-I_{CMP} \quad [\text{Equation 2}]$$

From the measured value of the solenoid current and the current command $I_{REF}$, the duty ratio of a PWM signal for on-off operation of a transistor is computed, thus ending the routine.

The current command $I_{REF}$, when computed, may be worked out from the temporary current command $I_{TMP}$ and the boost starting learning value $I_{LU}$.

$$I_{REF}=I_{TMP}+I_{LU} \quad [\text{Equation 3}]$$

Executing the processing shown in the flowcharts of FIGS. 5 and 6 at a specific time interval allows, as the time $T_5$ in FIG. 3, the flow of the current $I_5$ at the time the pressure-increasing is started. That is, by taking into account the pressure-increase starting current learning value $I_{LU}$ learned at the time $T_2$, the pressure command begins to increase from zero until at $\Delta T_{56}$, and the pressure sensor value rises. In this case, the time $\Delta T_{56}$ is shorter than the time $\Delta T_{12}$ required at the first time. It is, therefore, possible to constantly supply the appropriate solenoid current $I_5$ to the brake servo unit by executing the processing of the aforesaid solenoid current learning regardless of the working temperature of the device, thereby realizing smooth boosting of the pressure.

Next, the processing flowchart for pressure reduction (decreasing) will be explained. Immediately before the time $T_3$ in FIG. 3, the current is being supplied to the solenoid mechanism 402 in FIG. 4, presenting a pressure difference between the constant pressure chamber 406 and the working pressure chamber 405. In this state, the atmospheric pressure valve 403 and the vacuum valve 404 are both closed. At the time $T_3$, the solenoid current $I_3$ is supplied to the solenoid mechanism 402 from the control device 401. The pressure sensor value $P_{M/C}$ is a constant value until the time $T_4$. During this period, the vacuum valve 404 is in a closed position, gradually decreasing the solenoid current supply in the later-described processing flowchart. When the solenoid current reaches $I_4$ at the time $T_4$, the vacuum valve 404 is opened, and the atmosphere flows into the constant pressure chamber 406 from the working pressure chamber 405 through the passage 409, and furthermore flows out into the vacuum source 407 through the passage 410. Since the atmospheric pressure valve 403 is closed at this time, the pressure difference between the constant pressure chamber 406 and the working pressure chamber 405 decreases. Thereby, the force resulting from the pressure difference is gradually removed from the master cylinder piston, and the liquid pressure of master cylinder decreases, and the brakes are released. The pressure sensor value $P_{M/C}$ can be controlled according to the pressure command $P_{CMD}$ by appropriately changing the supply of the solenoid current by the processing flowchart in FIG. 8.

In FIG. 3, $\Delta T_{34}$ is the time required after the decrease of the pressure command $P_{CMD}$ at the time $T_3$ till the actual reduction (decreasing) of the pressure sensor value $P_{M/C}$. In order to reduce this required time at next time and after, the current supply is started with the current corrected based on the current $I_4$ at the time $T_4$ of when the decrease of the pressure sensor value $P_{M/C}$ could be observed.

Figure 7:
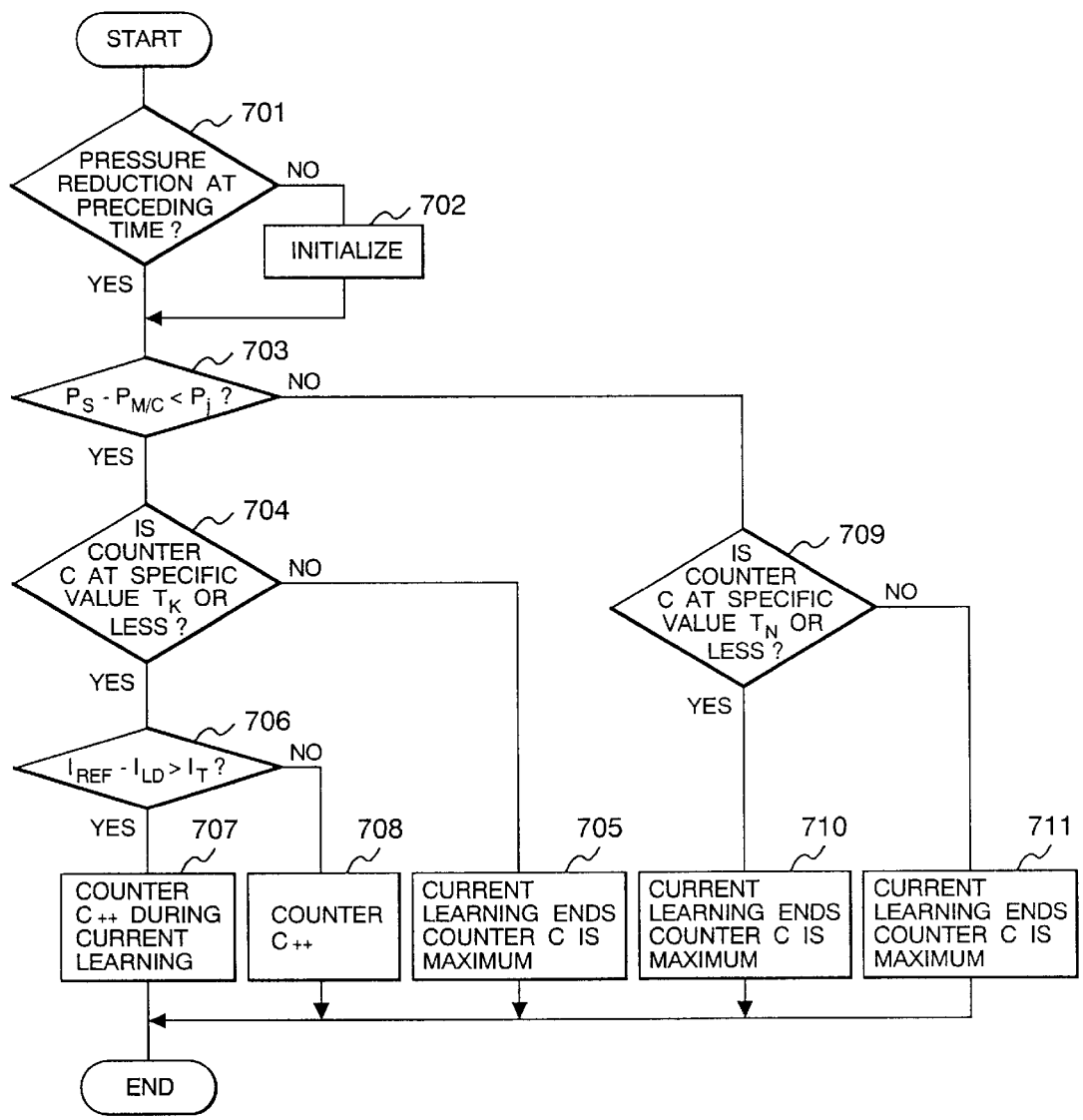
FIG. 7 is a flowchart showing a routine for learning a pressure-decrease starting current command.

FIG. 7 is a processing flowchart for realizing by software the learning function 114 of the pressure-decrease (pressure-reduction) starting current command in FIG. 1. At Step 701, a decision is made on the preceding control state. Step 703 is executed when the preceding control state is the state of pressure decrease, and Step 702 is performed when the preceding control state is other than the state of pressure decrease. Step 702 carry out the initial setting of the pressure-decrease starting pressure $P_s$ and the pressure-decrease learning counter C which are necessary for learning the pressure-decrease starting current learning value $I_{LD}$. The pressure-decrease starting pressure $P_s$ is the pressure at the time when the master cylinder changes into the pressure decrease mode. At Step 703, in order to distinguish the start of pressure-decrease mode, a comparison is made between the amount of pressure change ("the amount of pressure change" means a difference between the pressure-decrease starting pressure $P_s$ and the pressure sensor value $P_{M/C}$) and the specific value $P_j$. When the amount of pressure change is greater than the specific value $P_j$, the processing proceeds to Step 709, and when the amount of pressure change is smaller than the specific value $P_j$, the processing proceeds to Step 704. At Step 704, a comparison is made between the pressure-decrease learning counter C and the specific value $T_K$. The specific value $T_K$ is a limit time of the learning for the pressure-decrease starting current command. At Step 704, when the pressure-decreasing learning counter C is greater than the specific value $T_K$, the processing proceeds to Step 705. In this case, it means an unusual state which non-pressure-decrease of the master cylinder generates although the pressure-decreasing command is outputted. Therefore, at Step 705, the learning of the pressure-decreasing starting current learning value $I_{LD}$ is ended, and the counter C is set at the maximum value $C_{MAX}$, furthermore the pressure-decrease starting current command is set limited value. When the counter C is less than the specific value $T_K$, a decision is made at Step 706. At Step 706, a comparison is made on a difference between the present current command $I_{REF}$ and the last pressure-decreasing starting current (command) learning value $I_{LD}$. When the difference is greater than the specific value (the learning threshold) $I_T$, the processing at Step 707 is executed. Also when the difference is less than the specific value $I_T$, the processing at Step 708 is performed. Furthermore at Step 707, the pressure-decrease starting current learning value $I_{LD}$ and the pressure-decrease learning counter C are updated. On the other hand, at Step 708, the pressure-decrease learning counter C is updated.

At Step 709, a comparison is made between the pressure-decrease learning counter C and the specific value $T_N$. The specific value $T_N$ is the standard time for distinguishing whether the last pressure-decrease starting current learning value $I_{LD}$ is continued or not. When the pressure-decrease learning counter C is less than the specific value $T_N$, the counter C is set at the maximum value $C_{MAX}$ at Step 710. In this case, since the pressure decrease mode is executed precisely by the last learning value, no updating is made about the pressure-decreasing starting current learning value $I_{LD}$. In the meantime, an updating is done at Step 711 about the pressure-decrease decrease starting current learning value $I_{LD}$ when the counter C exceeds the specific value $T_N$, and the counter C is set at the maximum value $C_{MAX}$, ending the routine.

Figure 8:
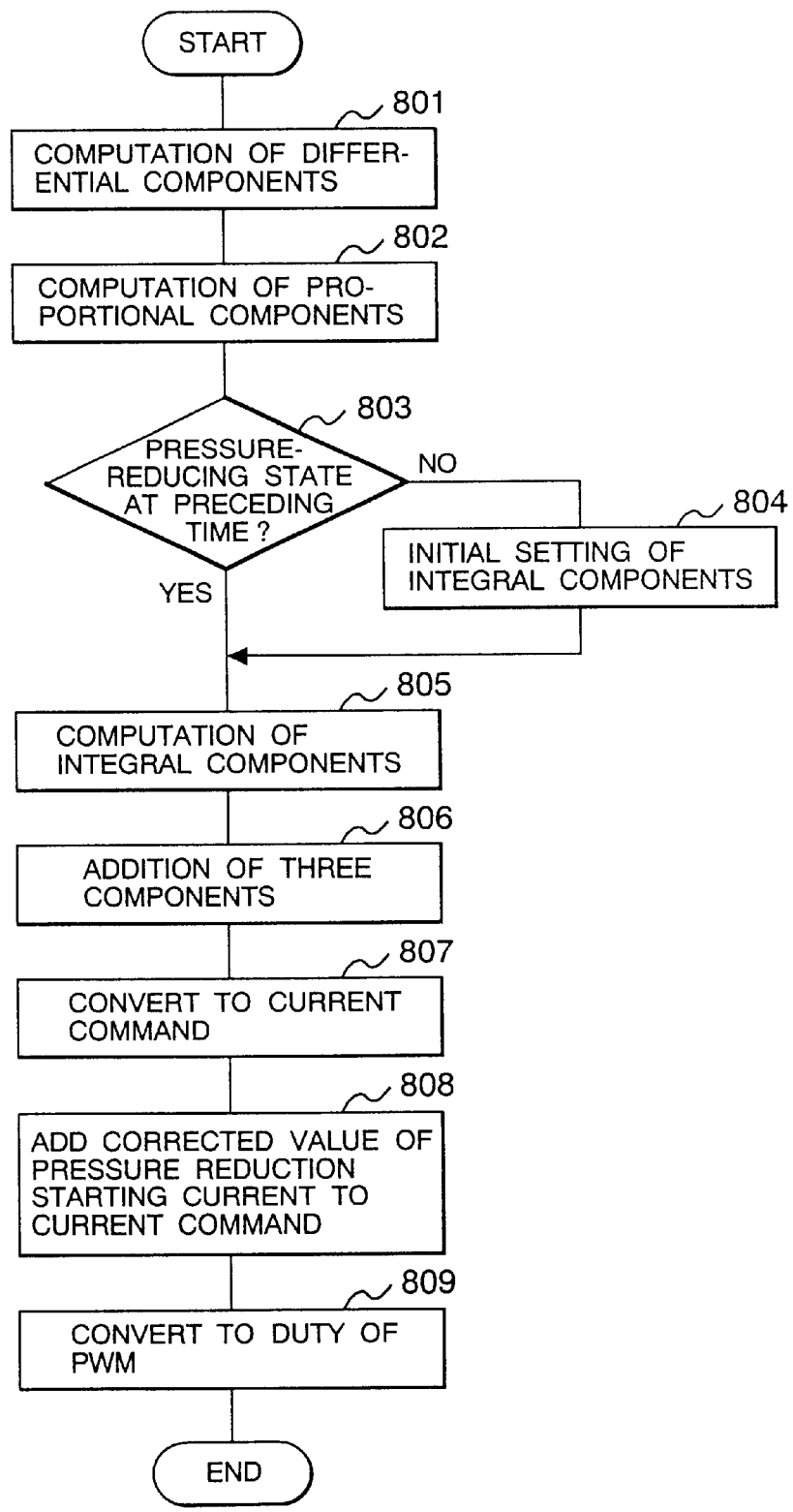
FIG. 8 is a process flowchart at the time of pressure decreasing.

FIG. 8 is a processing flowchart for realizing by software the pressure-decrease control function 110 and the pressure-current command conversion function 111 at the time of pressure decrease. At Step 801, the differential components of the pressure deviation ΔP are computed. At Step 802, the proportional components of the pressure deviation ΔP are computed. At Step 803, the preceding control state is decided. When the preceding control state is the state of pressure decrease, the processing proceeds to Step 805. Also when the preceding control state is other than the state of pressure decrease, the processing proceeds to Step 805 after initially setting the integral components at Step 804. At Step 805, the integral components are computed. Thereafter, at Step 806, the above-described three components are added.

$$P_{RD}=K_{PD}\times\Delta P+K_{ID}\times\int\Delta Pdt+K_{DD}\times\Delta\dot{P} \qquad \text{[Equation 4]}$$

Furthermore, at Step 807, a conversion is executed from the added control command $P_{RD}$ to the temporary current command $I_{TMP}$. In this conversion, the premeasured current-pressure static characteristics at the time of pressure decrease is utilized. At Step 808, the current command $I_{REF}$ is computed from the temporary current command $I_{TMP}$, pressure-decrease starting current learning value $I_{LD}$, and specific value $I_{CMPD}$.

$$I_{REF}=I_{TMP}+I_{LD}+I_{CMPD} \qquad \text{[Equation 5]}$$

At Step 809, the duty ratio of the PWM signal for the on-off operation of transistors is computed according to the measured value of the solenoid current and the current command $I_{REF}$, then ending the routine.

When computing the current command $I_{REF}$, the temporary current command $I_{TMP}$ and the pressure-reduction starting current learning value $I_{LD}$ may be added.

$$I_{REF}=I_{TMP}+I_{LD} \qquad \text{[Equation 6]}$$

Figure 9:
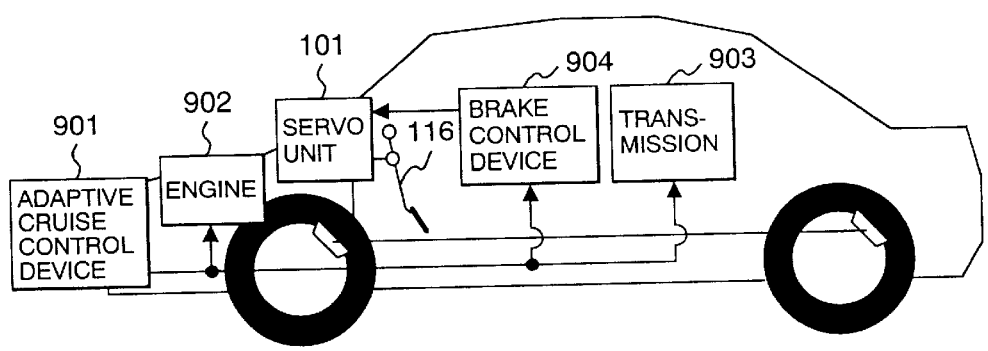
FIG. 9 is a vehicle mounted with the brake servo unit control device of the invention.

FIG. 9 is a block diagram for adaptive cruise control with the distance control between a car and the one in front, in vehicle mounted with the invention. The vehicle is mounted with an engine 902, a transmission 903, a servo unit 101, a control device 904, and an adaptive cruise control device 901. The adaptive cruise control device 901 has at least the following five functions: a function to measure a distance from a vehicle running ahead and a relative vehicle speed, a function to set a target value of vehicle speed, a function to set a target value of engine torque for matching the target value of the vehicle speed with the measured value of the vehicle speed, a function to set a target value of a brake liquid pressure command for matching the target value of the vehicle speed with the measured value of the vehicle speed, and a function to set a target gear ratio of the transmission. In order to increase a target value of vehicle speed according to the distance from the vehicle ahead and the relative vehicle speed, the target value of engine torque is increased. And thereby, the engine 902 is outputted the engine torque which has reached the target value of engine torque. And the vehicle accelerates, thereby the measured value of the vehicle speed matches with the target value. When the target value of the vehicle speed decreases according to the distance from the vehicle ahead and the relative vehicle speed, the target value of the brake liquid pressure command is increased. And thereby the control device 904 of the servo unit 101 operates to realize the brake liquid pressure which has reached the target value of the pressure command, the vehicle speed decelerates, thereby the measured value of the vehicle speed matches with the target value. At this time, the control device 904 provided with the invention is able to smoothly increase and decrease the brake liquid pressure, therefore enabling the realization of smooth deceleration. It should be noticed that the vehicle can be decelerated to match the measured value with the target value of the vehicle speed, by decreasing the target value of engine torque, with the target value of the brake liquid pressure command left at zero, or by changing the gear ratio of the transmission.

According to the invention, the constantly proper solenoid current can be supplied to the brake servo unit by updating the pressure-increase starting current learning value every time the pressure-increase is started except the first time after starting the device. This procedure is similarly applicable to the pressure decrease. It is, therefore, possible to smoothly control the brake liquid pressure albeit the servo unit working temperature changes.

It is also possible to constantly supply the appropriate solenoid current similarly to the brake servo unit by recording the measured value of the solenoid current.

What is claimed is:

1. A brake servo unit being configured to have at least one function to increase and decrease pressure of a master cylinder for brakes by brake pedal inputted power, and another function to increase and decrease pressure of said master cylinder by operating an automatic braking actuator based on a control device electric control signal, said automatic brake actuator having electromagnetic control valve mechanism configured to control operating power to said master cylinder at a time of automatic braking operation, with solenoid current to operate said control valve mechanism being controlled by said electric control signal, wherein pressure in said master cylinder increases from zero pressure to a peak, and then decreases to zero pressure at a time of automatic braking and constitutes an automatic braking control per time, wherein a control device that outputs the electric control signal is configured to detect and record a solenoid current value at a start of the pressure increase in said master cylinder when the first automatic braking control is performed after starting said control device, and to correct an initial value of said solenoid current of control-starting based on said solenoid current value recorded when second and subsequent automatic braking control is performed.

2. A brake servo unit according to claim 1, wherein said control device is configured to detect and record the solenoid current value at a start of the pressure decrease in said master cylinder when the first automatic braking control is performed, and to correct the initial value of said solenoid current of the pressure decrease-starting based on said solenoid current value recorded when the second and subsequent automatic braking control is performed.

3. A brake servo unit configured to have at least one function to increase and decrease pressure of a master cylinder for brakes by brake pedal inputted power, and another function to increase and decrease pressure of said master cylinder by operating an automatic braking actuator based on a control device electric control signal, said automatic braking actuator having electromagnetic control valve mechanism configured to control operating power to said master cylinder during automatic braking, with solenoid current to operate said control valve mechanism being controlled by said electric control signal, wherein pressure in said master cylinder increases from zero pressure to the peak, and then decreases to zero pressure at a time of automatic braking and constitutes an automatic breaking control per time, wherein a control device that outputs the electric control signal is configured to detect and record a solenoid current value at a start of the pressure increase in said master cylinder when the automatic braking control is performed, and to correct an initial value of said solenoid current of control-starting based on said solenoid current value recorded at the previous automatic braking control when the next automatic braking control is performed.

4. A brake servo unit according to claim 3, wherein said control device is configured to detect and record said solenoid current value at a start of the pressure decrease in said master cylinder when the automatic braking control is performed, and to correct the initial value of said solenoid current of the pressure decrease-starting based on said solenoid current value recorded at the previous automatic braking control when the next automatic braking control is performed.

* * * * *